Dec. 11, 1956       J. GRONEK       2,773,603
COMBINED FISH BAG HOLDER AND FISHING POLE REST
Filed March 13, 1953
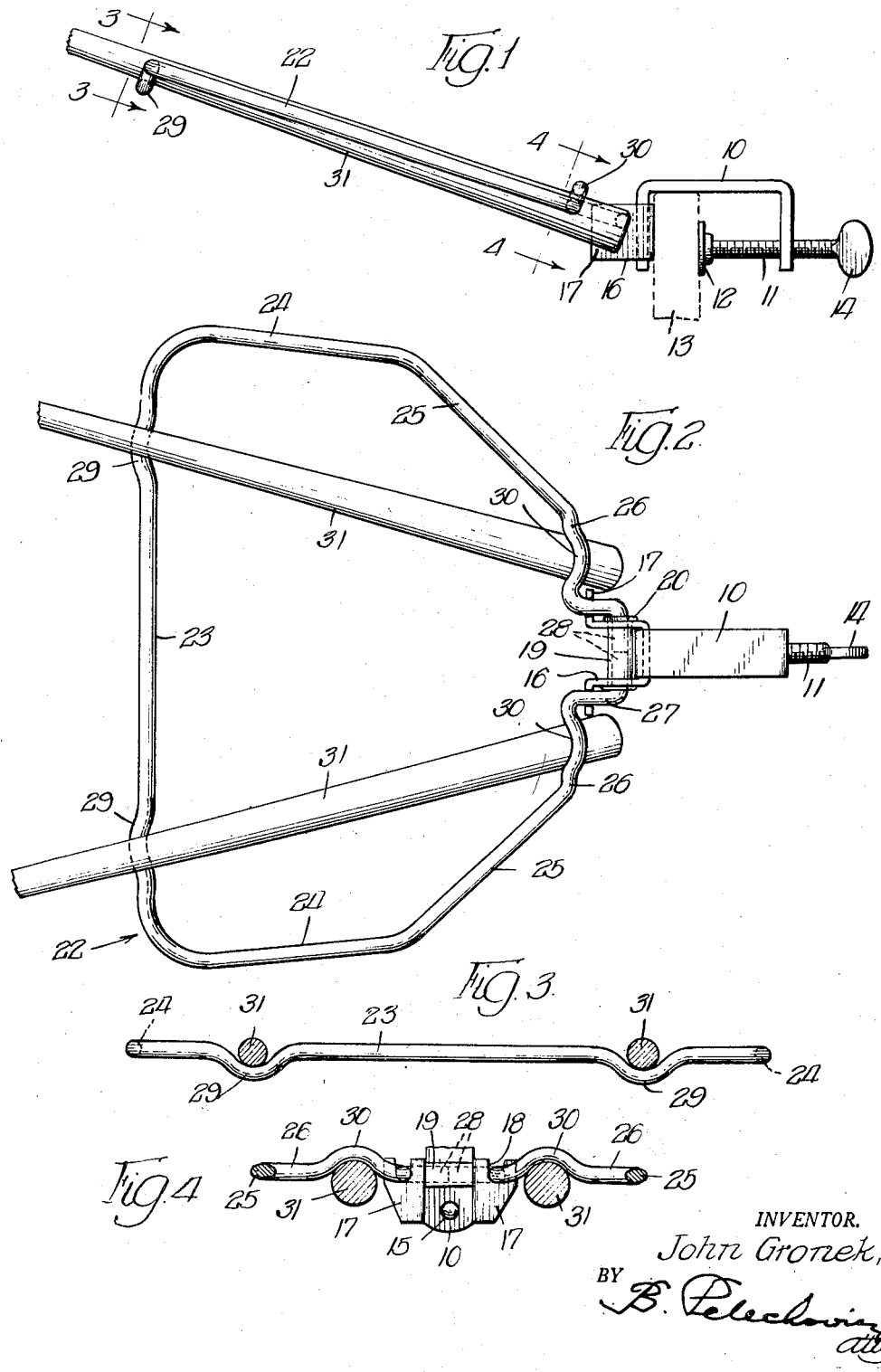
INVENTOR.
John Gronek,
BY

2,773,603
COMBINED FISH BAG HOLDER AND FISHING POLE REST

John Gronek, Chicago, Ill.

Application March 13, 1953, Serial No. 342,090

1 Claim. (Cl. 211—1)

The present invention relates to the fish bag holders and fishing pole rests, and has for its main object the provision of a fish bag frame suitably formed for the purpose of supporting one or more fishing poles for preventing the fishing pole from making any vertical shifting movements or any lateral shifting movements from a normal fishing position of the pole.

With the above general object in view and others that will appear as the invention is better understood, the same consists in the novel construction, combination and arrangement of parts hereinafter more fully described, illustrated in the accompanying drawing and pointed out in the appended claim.

In the drawing forming a part of this application, and in which like designating characters refer to corresponding parts throughout the several views;

Fig. 1 is a side elevational view of a fish bag frame, suitably supported upon the side of a boat, with a fishing pole in an operative position upon said frame;

Fig. 2 is a top plan elevational view of the present device with a pair of fishing poles supported upon the fish bag frame;

Fig. 3 is a cross sectional view on line 3—3 of Fig. 1; and

Fig. 4 is a cross sectional view on line 4—4 of Fig. 1.

Referring in detail to the present drawing there is shown a U-shaped clamp member 10, through one leg of which screw bolt 11 is extended. Head piece 12 in a swivelled relation with the inner end of said screw bolt 11, in conjunction with the other leg of the clamp member 10 clamps the side of boat 13. Thumb piece 14 carried by the opposite end of screw bolt 11 defines a means whereby said screw bolt 11 may be manually rotated for engaging with or disengaging said clamp member 10 from the side of boat 13.

Rigidly affixed to said other leg of clamp member 10 by means of rivet 15 is U-shaped bracket 16. The free terminations of the sides of said U-shaped bracket 16 are formed with laterally extending wings 17, which have recesses 18 formed at their upper edges. Tubular member 19 is extended through the sides of said U-shaped bracket 16. The ends of said tubular member 19 have flanges 20 which remain in contact with the outer faces of the sides of said U-shaped bracket 16. By virtue of this arrangement the sides of said bracket are rigidly connected and are prevented from spreading, and at the same time said tubular member 19 is held in a rigid position relative to said U-shaped bracket 16.

Said tubular member 19 is on a plane below the plane of the body portions of said wings 17 adjacent the bottoms of said recesses 18.

The fish bag frame, generally indicated by 22, adapted for support by and upon U-shaped bracket 16, is made of a single strip of cylindrical metallic material, such as a rod or the like, and includes longer side 23, from which end members 24 project. Links 25 project from said end members 24 in a convergent direction. Side members 26 project from said links 25. Said side members 26 are substantially in a parallel relation with said longer side 23. Arms 27 project from said side members 26 in a parallel mutual relation, and in a perpendicular relation with said side members 26 and the longer side 23. Formed with the free ends of said arms 27 are extensions 28 which enter said tubular member 19 and which define a pivot upon which frame 22 is adapted to swing to its operative extended position shown in Figs. 1 and 2, or to its raised inoperative position. When in the extended operative position of frame 22 arms 27 enter recesses 18 wherein said arms 27 are supported upon the upper ends of said wings 17.

By virtue of the fact that said tubular member 19 is upon a plane lower than the plane upon which the upper portions of wings 17 within recesses 18 are located frame 22 remains at an incline while in its extended operative position, as seen in Fig. 1, with the longer side 23 of the frame being disposed farther away from boat 13 than said side members 26.

By virtue of the inherently resilient nature of frame 22 extensions 28 tend to spring towards each other and to remain in a mutual contact while in tubular member 19. By virtue of this arrangement frame 22 may be removed from its connection with U-shaped bracket 16 by manually spreading arms 27 away from each other until extensions 28 are freed from tubular member 19.

Formed in the longer side 23 of the frame is a pair of downwardly depending bends 29, one adjacent each end of said side 23 and in the proximity of each of said end members 24. Formed in each of said side members 26 is an upwardly extending bend 30. Said bends 29 define depressions within which fishing poles 31 are adapted to enter, having been placed therewithin from above frame 22. The ends of poles 31 are adapted to be placed within bends 30 from below frame 22. By virtue of the fact that the opposite ends of poles 31 are heavier than the ends thereof resting upon frame 22 the nearer ends of said poles 31 will contact bends 30 from below. By virtue of this arrangement the poles will be prevented from making shifting movements or lateral movement upon frame 22.

The fishing pole rest in combination with fish bag frame adds to the economy of space in connection with fishing boats.

While there is described herein preferred embodiments of the present invention, it is nevertheless to be understood that minor changes may be made therein without departing from the spirit and scope of the invention as claimed.

I claim:

A fish bag holder and a fishing pole rest comprising a fish bag supporting frame, said frame including a straight side having a pair of widely spaced apart, upwardly opening notches therein each adapted to receive a fishing pole and support it from below, end members extending from said straight side in a substantially perpendicular relation therewith, side members extending from the ends of said end members, each of said side members being in a substantially parallel relation with said straight side and having a downwardly opening notch therein adapted to receive a fishing pole and engage it from above, the space between said downwardly opening notches being substantially less than the space between said upwardly opening notches so that a fishing pole supported by one of said upwardly opening notches and the downwardly opening notch adjacent thereto will be in a diverging relationship with respect to a fishing pole supported by the other two of said notches, a pair of parallelly disposed arms extending from the ends of said side members, said arms being in a substantially perpendicular relation with said side members and said straight side, a pivot extending laterally from the end of each arm, and bracket means for connecting said frame to the side of a boat and supporting said frame in position over the water adjacent the side of the boat, said bracket means having an opening therein for receiving said pivots and having a pair of bearing portions upon which said arms may rest, said bearing portions being disposed above said pivot-receiving opening to impart an inclination to said frame so that said notches support said fishing poles at the proper inclination.

References Cited in the file of this patent

UNITED STATES PATENTS

| | | |
|---|---|---|
| 1,158,013 | Vonderake | Oct. 26, 1915 |
| 1,529,265 | Merckel | Mar. 10, 1925 |
| 2,100,235 | Brown | Nov. 23, 1937 |
| 2,367,588 | Kruse | Jan. 16, 1945 |
| 2,416,828 | Hamre | Mar. 4, 1947 |
| 2,596,403 | Hoffman | May 13, 1952 |